United States Patent [19]
Rusch et al.

[11] Patent Number: 5,103,373
[45] Date of Patent: Apr. 7, 1992

[54] ELECTRICAL SWITCHING DEVICE FOR FIXING TO A PROFILED RAIL

[75] Inventors: Arthur Rusch, Emmenbrücke; Daniel Mischon, Neuenkirch, both of Switzerland

[73] Assignee: Weber AG, Emmenbrucke, Switzerland

[21] Appl. No.: 638,361

[22] Filed: Jan. 4, 1991

Related U.S. Application Data

[63] Continuation-in-part of Ser. No. 350,523, Mar. 17, 1989, abandoned.

[30] Foreign Application Priority Data

Jul. 17, 1987 [CH] Switzerland .................. 2724/87

[51] Int. Cl.⁵ ............................................... H02B 1/04
[52] U.S. Cl. .................................... 361/335; 361/331; 361/376; 361/420
[58] Field of Search ............ 200/293, 294, 296; 248/225.1, 225.2; 361/331, 335, 346–348, 353, 376, 417, 419, 420, 427

[56] References Cited

U.S. PATENT DOCUMENTS 4,672,508  6/1987  Bridger .......................... 361/353
4,698,726 10/1987  Ootsuka et al. ................ 361/353

FOREIGN PATENT DOCUMENTS 0061664 10/1982 European Pat. Off. .
0184143  6/1986 European Pat. Off. .
232572   8/1963 Fed. Rep. of Germany .
8712955 10/1987 Fed. Rep. of Germany .

OTHER PUBLICATIONS

Leaflet of AEG-Telefunken (no date).

*Primary Examiner*—Gregory D. Thompson
*Attorney, Agent, or Firm*—Tarolli, Sundheim & Covell

[57] ABSTRACT

A novel fixing element (5) is proposed which extends over the entire housing base (2) of the switching device (1) and, with the housing base (2), forms a locking mechanism. Provided in the housing base (2) is a rectangular recess (3) which is substantially wider than the width of the profiled rail (4) and forms a nose (24) which grips round the profiled rail (4). The locking mechanism is formed by one end of the fixing element (5), and the other end has a second nose (23) which grips round the profiled rail (4). The fixing element (5) can subsequently be attached to the riveted or screwed-together switching device (1).

9 Claims, 5 Drawing Sheets

ELECTRICAL SWITCHING DEVICE FOR FIXING TO A PROFILED RAIL

This is a continuation-in-part of copending applications Ser. No. 07/350,523 filed on Mar. 17, 1989 and International Application PCT/CH/88/00120 filed on Jul. 7, 1988 and which designated the U.S.

BACKGROUND OF THE INVENTION

1. Technical Field

The invention relates to an electrical switching device for fixing to a profiled rail.

2. Background Art

EP-A-0,184,143, for example, discloses such an electrical switching device. The switching device described there has a transverse-channel-like recess which is widened over the mounting rail area up to a housing margin. Two opposite noses surround the leg ends of the mounting rail, one nose being integrally formed on a slide. Pressure directed inwards is exerted on the slide by means of a torsion spring or an omega spring. This pressure is lifted when the switching device is pushed back. The switching device can be pushed back until the bus-bar no longer covers the outer contour of the contact parts.

However, the above slide requires an additional locking facility so that the switching device is not tilted when the contact screws are tightened. At the same time, the locking facility is intended to prevent the switching device from being released from the mounting rail by unintentional manipulation (striking, shaking or the like). This locking facility consists of a rocker or is integrally formed in one piece on the slide in the form of saw teeth, corresponding saw teeth being provided on the base surface of the switching device. A disadvantage in this arrangement is that the locking facility is on the same side as the terminal connections for the bus-bar. The locking facility is therefore concealed by the mounting rail. Consequently it is very awkward to unlock the locking facility of a switching device snapped onto the mounting rail. Furthermore, the slide has a claw which overlaps the legs of a mounting rail having a hat-like profile. The switching device can only be fixed to rails having a hat-like profile according to DIN EN 50022, since the claw does not permit the switching device to be snapped onto other mounting rails.

SUMMARY OF THE INVENTION

The object of the invention is then to achieve, in the electrical switching device of the above-mentioned type, improved fixing to a standardized and/or commercially available profiled rail. At the same time, a readily accessible locking mechanism of the fixing element is to be achieved.

For an electrical switching device of the above-mentioned type, this object is achieved by the features of Claim 1.

The invention has the great advantage that the fixing of lined-up switching devices to all conventional profiled rails is ensured. At the same time, every individual switching device can be pushed away particularly easily from the bus-bar and from the profiled rail. On account of the simple construction with a U-shaped spring clip or a detent-like leaf spring, the fixing element can be subsequently attached to the screwed or riveted switching device. The switching device is fixed very rigidly to the profiled rail in the longitudinal and transverse direction. This is especially important when aligning switching devices on the profiled rail. Another important advantage is that the locking mechanism is located on the side of the switching device which is opposite the bus-bar. This ensures that the locking mechanism is readily accessible and cannot be unlocked unintentionally when mounting on the bus-bar.

BRIEF DESCRIPTION OF THE DRAWINGS

Further advantages of the invention follow from the description below. In the description, the invention is explained in greater detail with reference to exemplary embodiments shown in the drawings in which:

FIG. 2b shows a section along line 2b—2b in FIG. 2a,

FIG. 5b shows a section along line 5b—5b in FIG. 5a.

In the figures, the same reference numerals are always used for the same elements.

DESCRIPTION OF PREFERRED EMBODIMENTS

Figure 1A:
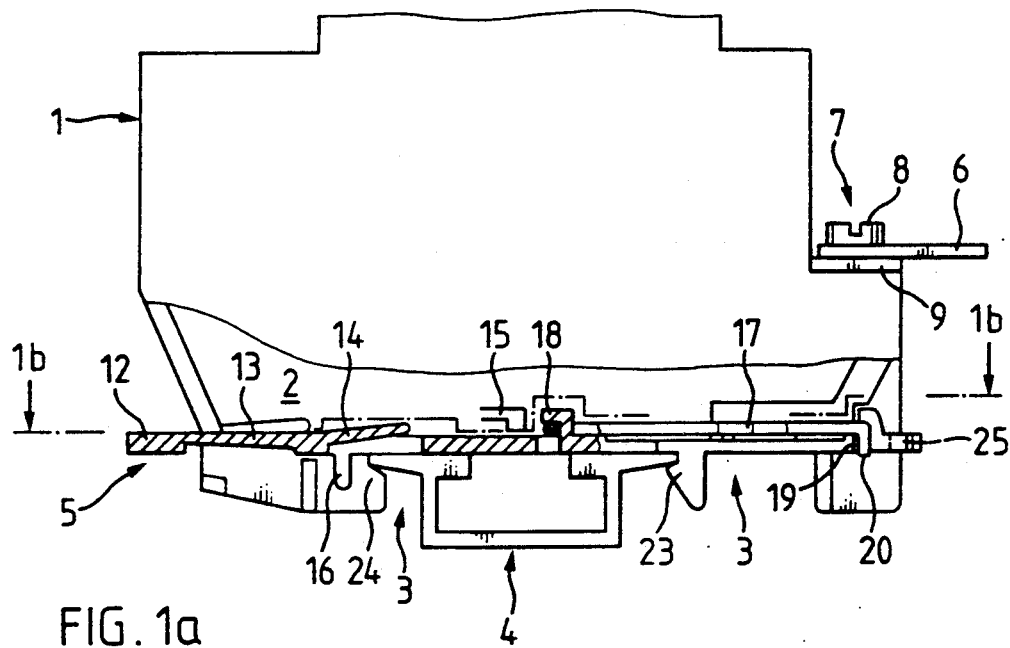
FIG. 1a shows a section along line 1a—1a in FIG. 1b and shows the lateral contour of a switching device having a locked fixing element.
Figure 1B:
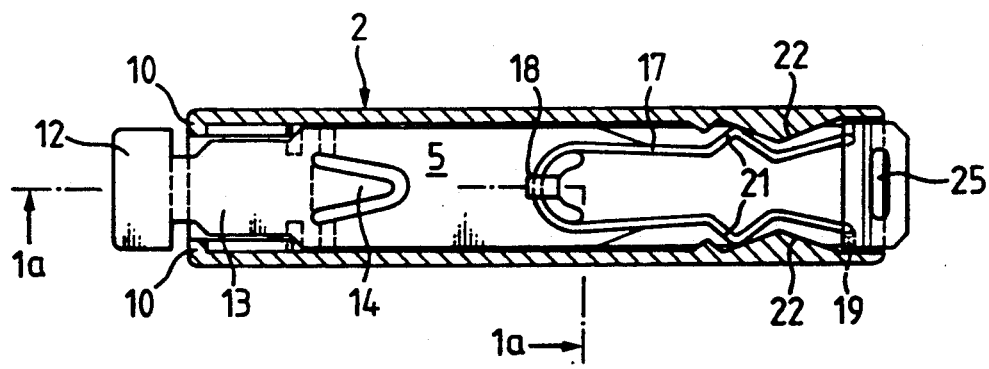
FIG. 1b shows a section along line 1b—1b in FIG. 1a, FIG. 2a shows a section along line 2a—2a in FIG. 2b and shows the same switching device as in FIG. 1a in the unlocked condition.

The contour of a switching device 1 is indicated in FIG. 1a. Provided in the housing base 2 is a wide recess 3 which is substantially wider than the width of the profiled rail 4 onto which the switching device, with a fixing or fastening element 5 displaceable in the housing base, is snapped. The profiled rail 4 has a hat-like profile and is commercially obtainable. The profiled rail 4 shown here has a combination of a hat profile and a C-profile and is made of aluminum. A bus-bar 6 is screwed to a terminal connection 7 which consists of a screw 8 and a connection piece 9. At its left hand end, the fixing element 5 has a locking mechanism which is formed from the end, designed as a wide extension 12, of the fixing element 5. The wide extension 12 is connected to a stepped part 13, narrowed towards the left, of the fixing element 5, as can clearly be seen from FIG. 1b. In this area, the housing base 2 is correspondingly narrowed with base lugs 10, so that the wide extension 12 prevents unintentional displacement of the fixing element 5. A small tongue 14 is located in the fixing element 5 approximately above the left hand leg of the profiled rail 4. The tongue 14 points slightly upwards and, on account of a stop 15 in the housing base 2, prevents the fixing element 5 from being displaceable too far to the right. To the left of the profiled rail 4, a projection 16 is provided at the bottom on the fixing element 5, which projection 16, when the switching device 1 is locked, strikes against the profiled rail 4. A U-shaped spring clip 17 is attached to the right hand part of the fixing element 5. Arranged above the right hand leg of the profiled rail 4 on the fixing element 5 is a claw 18 which engages round the center part of the spring clip 17. Located at the right hand end of the fixing element 5 in the marginal area are two small openings 19 into which the ends 20, bent downwards, of the spring clip 17 are hooked. The two legs of the spring clip 17 are formed with detents 21 protruding outwards, as is apparent from FIG. 1b. Opposed detents 22 protruding inwards are provided in the housing base 2, against which detents 22 the detents 21 of the spring clip 17 press (FIG. 1b). To the right of the profiled rail 4, a nose 23 is attached to the fixing element 5, which nose 23 engages round the right hand leg of the profiled rail 4. A nose 24 is likewise provided on the left hand side of the recess 3 in the housing base 2, which nose 24 engages round the left hand leg of the profiled rail 4. The right hand end of the fixing element 5 is provided with an enclosed slot 25 (FIG. 1b) into which a screwdriver can be inserted for displacing the fixing element 5.

Figure 2A:
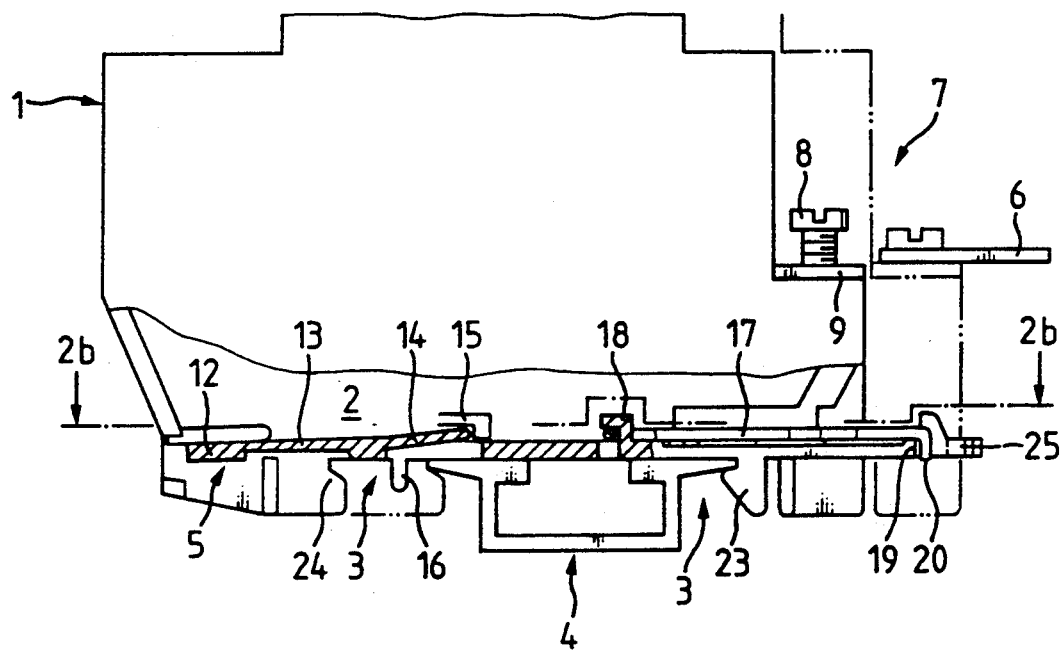
Figure 2B:
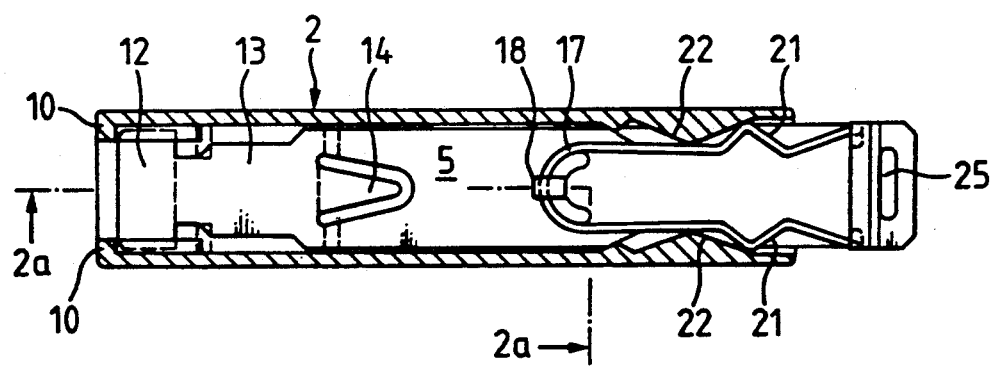
Figure 3A:
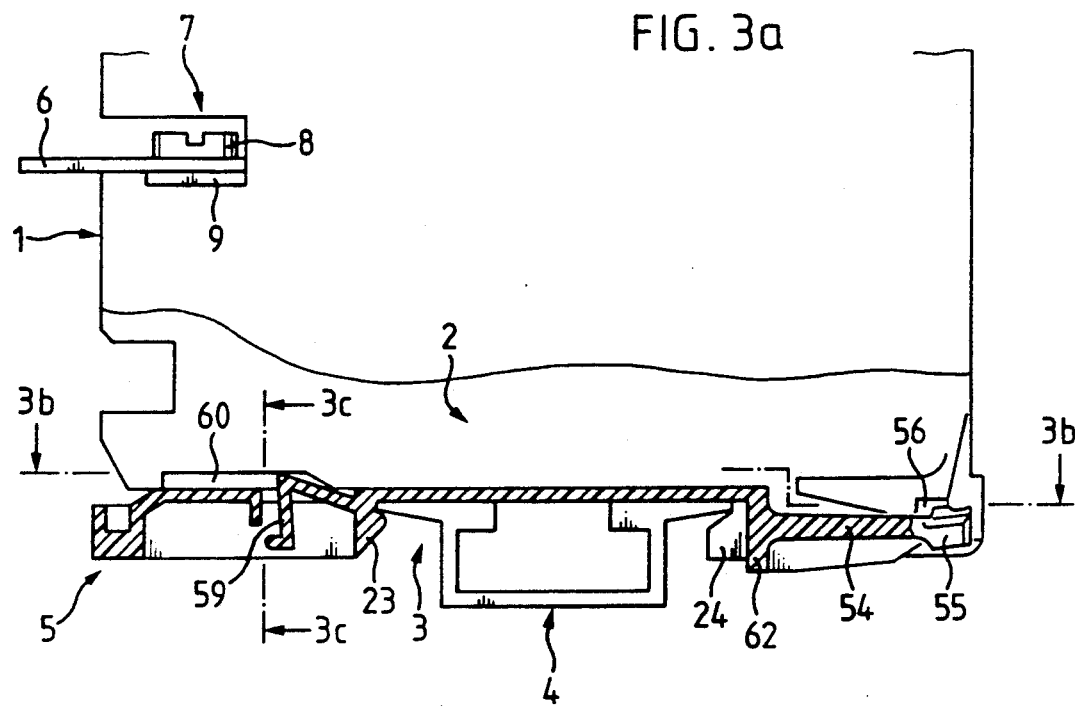
FIG. 3a shows a contour of a switching device having a second, locked fastening element.
Figure 3B:
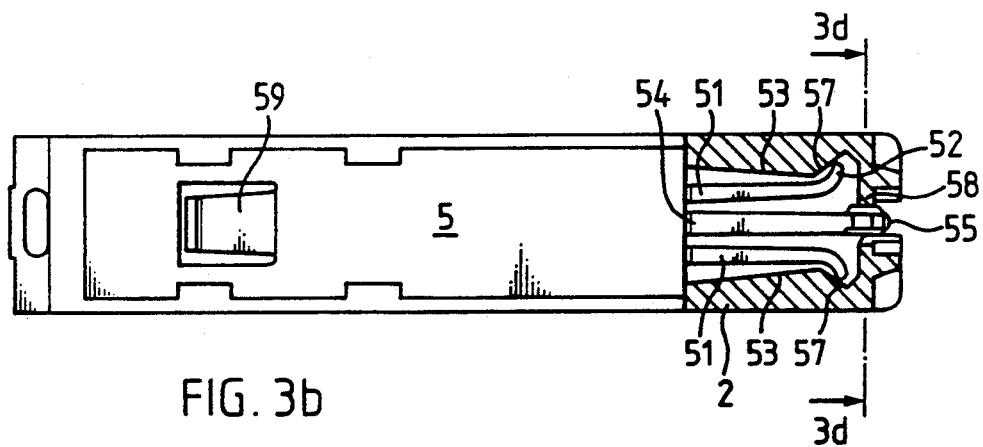
FIG. 3b shows a section along line 3b—3b in FIG. 3a, FIG. 3c shows a section along line 3c—3c in FIG. 3a, FIG. 3d shows a section along line 3d—3d in FIG. 3b.
Figure 3C:
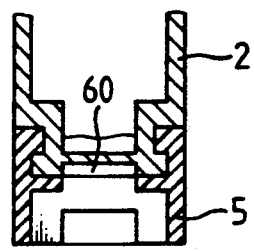
Figure 3D:
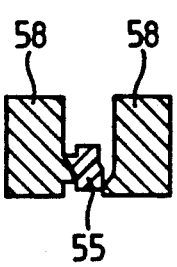

In FIGS. 2a and 2b the fixing element 5 has been unlocked. For this purpose, the wide extension 12 is pressed down and the switching device 1 displaced to the left. The bus-bar 6 has thus been released (shown by broken lines) in FIG. 2b, and the switching device 1 can be turned away around the right hand leg of the profiled rail 4 and/or removed upwards from the bus-bar 6. Instead of a connection to a bus-bar, the switching device 1 can also be wired in a conventional manner. In this case, the fixing element 5 is advantageously displaced with a screwdriver in the slot 25 until the wide extension 12 makes contact. This slight displacement is then sufficient to remove the switching device 1 from the profiled rail 4.

In the FIGS. 3a, 3b, 3c and 3d is represented, by way of indication, a switching device 1 having a second variant of the fastening element 5 in the locked condition. Here, unlike the previously described embodiment, no spring is any longer provided as a separate element. For this, two springy tongues 51 are formed directly on the fastening element 5 itself. The free ends 52 of the springy tongues 51, arranged substantially parallel with each other, are bent outward and lie on slides 53 which are formed in the bottom of the housing base 2 of the switching device 1. The fastening element 5 is locked in the bottom of the housing base 2 by means of a blocking catch 54 formed between the two springy tongues, also on the fastening element 5. At its free end 55, the blocking catch 54 is designed hook-shaped and engages upward by this hook-shaped end with some play (in the lengthwise direction of the fastening element 5) in a corresponding opening 56 in the bottom of the housing base 2. The free end 55 of the blocking catch 54 is also flanged at the side by two ridges 58 springing forwardly inwardly in the bottom of the housing base 2. The above-mentioned play is measured so that the fastening element 5 can be pushed along in relation to the housing base 2 (or this latter in relation to the fastening element 5) precisely by the width of the nose 23 also formed on it. In this small zone of movement, the also formed on it. In this small zone of movement, the above-mentioned slides 53 in the housing base 2 are also provided with steep flanks 57 so that a relatively strong return force is provided through which the fastening element (in FIGS. 3a and 3b) is pressed to the right in the housing base 2. The nose 23 formed on the fastening element 5 is thereby pre-stressed elastically against the nose 24 formed on the housing base 2 by which the switching device 1 is allowed to snap onto the profiled rail 4. However, this is only possible when no bus-bar 6 is mounted. How the switching device 1 is set on the profiled rail 4 and can be connected to the bus-bar 6, even with the bus-bar 6 mounted, will be described further below. However, the reverse process should be explained first.

Figure 4A:
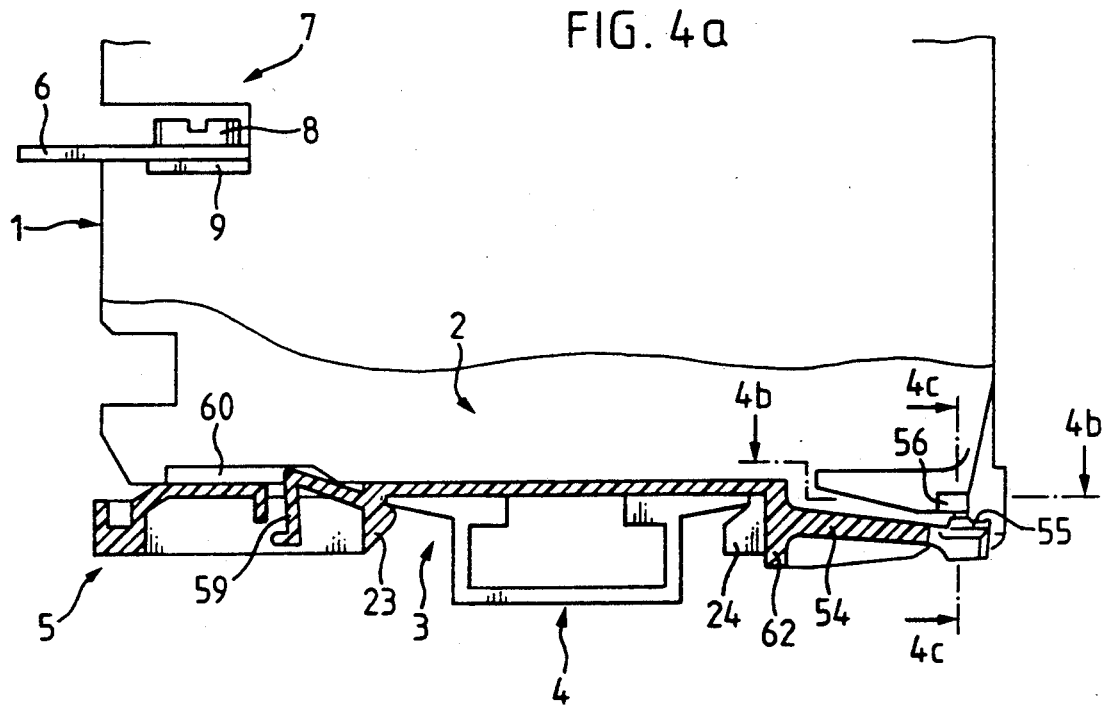
FIG. 4a shows the same switching device as in FIG. 3a-3d, in unlocked, but still undisplaced condition.
Figure 4C:
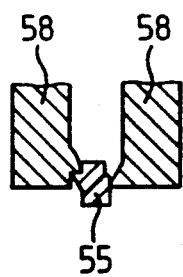
FIG. 4b shows a section along line 4b—4b in FIG. 4a, FIG. 4c shows a section along line 4c—4c in FIG. 4a, FIG. 5a shows the same switching device as in FIG. 3a-3d and FIG. 4a-4c, but in displaced condition.
Figure 4B:
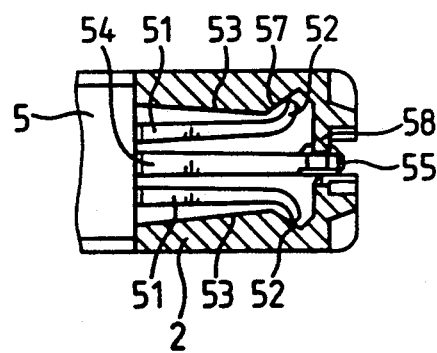
Figure 5A:
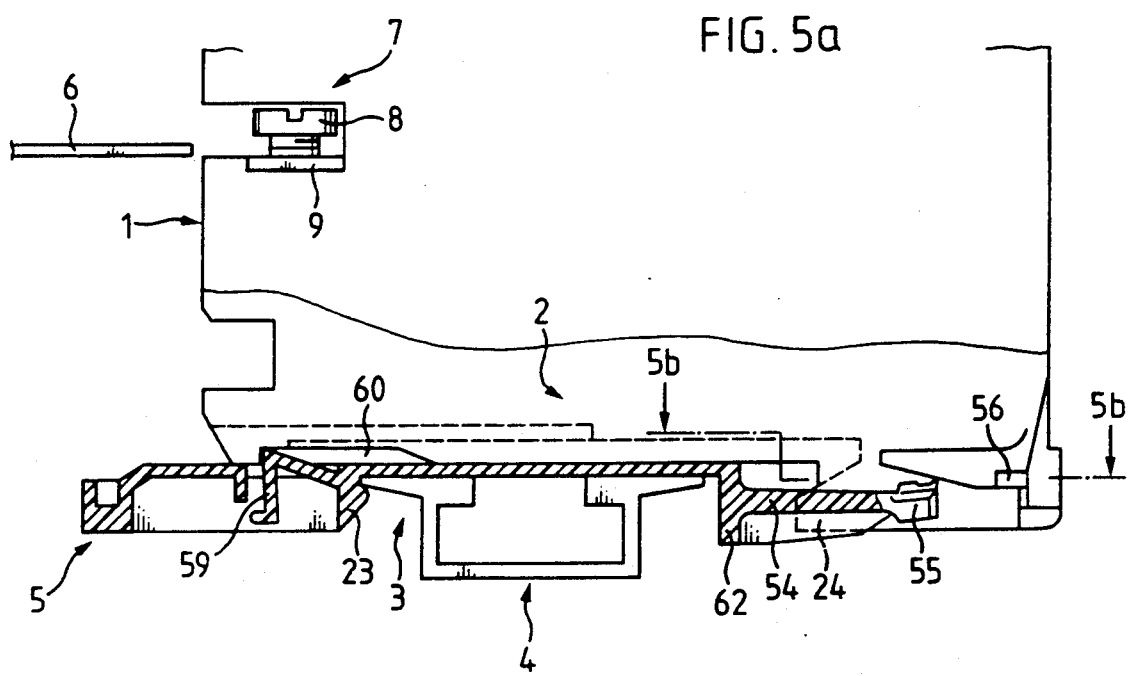
Figure 5B:
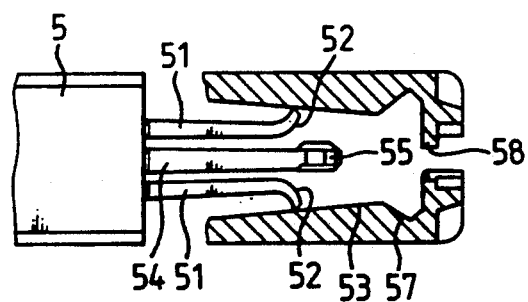

In order to be able to remove the switching device 1 which is snapped onto the profiled rail 4 with the bus-bar 6 mounted from the zone covered by the bus-bar 6, the tie screw 8 of the clamp connection 7 must first be loosened. Then the locking, described before, must be loosened. The limited possibility of movement of the fastening element 5 in the housing base 2, so long as the locking is still not loosened, does not suffice to be able to push the switching device 1 far enough away from the bus-bar 6. The loosening of tie locking takes place by pressing down the blocking catch 54 (for example, by means of a screwdriver) from the position shown in FIG. 3c and 3d into the position shown in FIGS. 4a and 4c. In the last-named position, the hook-shaped free end 55 of the blocking catch 54 is out of engagement with the opening 56 in the housing base 2. Because of the small catch and guide cams, the blocking catch 54 is caught in the unlocking position shown in FIG. 4c. The catch and guide cams formed on the ridges 58 or the free end 55 of the blocking catch 54 extending in between them may be seen well in FIGS. 3d and 4c. Unlocked in this way, the switching device 1 on the profiled rail 4 can be pushed from its position shown in FIGS. 3 and 4 into the position shown in FIG. 5a. In this position, covering no longer exists between the switching device 1 and the bus-bar 6. Therefore, the switching device 1 can be removed from the profiled rail unhindered by the bus-bar 6.

In pushing the switching device 1 onto the profiled rail 4, the return force must first be overcome, which is caused by the springy tongue 51 lying elastically against the steep flanks 57 of the slides 53. Beyond the steep flanks 57, the slides 53 widen somewhat outward again by which the direction of the setting force is reversed. This supports and facilitates the pushing process considerably. As can be seen from FIG. 5a, the fastening element 5 remains stationary with pushing of the switching device 1 out of the zone of overlapping with the bus-bar 6, since it engages by its nose 23 around the profiled rail 4 from the left. The zone of displacement is limited by a tongue 59 on the fastening element 5, which engages in a corresponding opening 60 in the housing base 2. In the position of maximum displacement of the switching device 1, shown in FIG. 5a in relation to the profiled rail 4, the tongue 59 is stopped at the left edge of the opening 60.

In order to set the switching device 1 or a correspondingly designed exchange device on the profiled rail 4 with the bus-bar 6 mounted and to be able to connect to the bus-bar 6, the procedure must be exactly opposite that described above. First of all, therefore, the fastening element 5 in the housing base 2 of the switching device 1 must be brought into the position shown in FIG. 5a. Through the slides 53 widening again beyond the steep flanks 57 (to the left), the fastening element 5 in the housing base 2 is held elastically into this position. The switching device 1 can now be set unhindered by the bus-bar 6 onto the profiled rail 4 and joined on these pushed to the left into overlap with the bus-bar 6. The function of the nose 23 in the removal of the switching device from the profiled rail 4, is namely to hold stationary the fastening element 5 with pushing along of the switching device 1, comes now to the projection on the fastening element 5. This latter, in pushing the switching device 1 to the left, strikes against the right leg of the profiled rail 4. As soon as the switching device 1 is pushed so far that the springy tongues 51 formed on the fastening element 5 come again into the zone of the steep flanks 57 of the slides 53, the return force again comes into action and drives the switching device 1 fully into its position shown in FIG. 3a. With this, the hook-shaped end 55 of the blocking catch 54 again comes into engagement with the opening 56, so that the prescribed locking of the fastening element 5 in the housing base 2 is provided again automatically.

It will be understood that the fixing elements revealed above can also include other variants.

Having described the invention, the following is claimed:

1. An electrical switching device (1) for fixing to a profiled rail (4), comprising:
   a housing base (2) having a rectangular recess (3) which is provided in the housing base (2), the rectangular recess (13) being substantially wider than the width of a profiled rail (4), said housing base (2) has a clamping connector and has, at least on one side, a first nose (24) which grips round the profiled rail (4), and
   a fixing element (5) which is displaceably mounted, under spring force, in the housing base (2) at right angles to the profiled rail (4) and has a second nose (23) which is opposite the first nose (24) and grips round the profiled rail (4) characterized in that:
   the fixing element (5) extends over the entire housing base (2), the fixing element (5) being movable relative to the housing base (2) between a position in which the clamping connected can be connected to an assembly bar (6) and another position in which the switching device (1) can be removed from the profiled rail (4) unhindered by the assembly bar (6),
   one end of the fixing element (5), with the housing base (2), forms a locking mechanism (10, 12),
   the other end of the fixing element (5) has the second nose (23), the fixing element (5) has a U-shaped spring clip (17) whose two legs have lateral detents (21), correspondingly opposed detents (22) are provided in the housing base (2), the detents (21,22) have a profile which allows a spring force to change its direction as a function of the position of the fixing element (5).

2. An electrical switching device according to claim 1, characterized in that the fixing element (5) consists of a plastic part, and the U-shaped spring clip (17) is about half the length of the housing base (2) and is arranged above the second nose (23) of the fixing element (5).

3. An electrical switching device according to claim 1, characterized in that a projection (16) is provided on the fixing element (5) opposite the second nose (23) in such a way that the distance between the second nose (23) and the projection (16) is slightly greater than the width of the profiled rail (4).

4. An electrical switching device (1) for fixing to a profiled rail (4) having a longitudinal direction and a hat-shaped profile with two outward spring legs, the switching device (1) begin snappable onto the profiled rail (4), the switching device (1) comprising:
   a housing base (2) including a clamping connector and a first nose (24), the clamping connector being located on one side of the housing base (2) for connecting to an assembly bar (6), the first nose (24) being formed on the bottom of the housing base (2);
   a fastening element (5), the fastening element (5) being movable relative to the housing base (2) along the bottom of the housing base (2) between an unlocked position and a locked position in which the clamping connector can be connected to the assembly bar (6), the fastening element (5) and the housing base (2) being resiliently supported against each other, the fastening element (5) being movable up to a first possible range of movement relative to the housing base (2) to allow the switching device (1), when being snapped on a profiled rail (4), to be moved relative to the profiled rail (4) in a direction perpendicular to the longitudinal direction of the profiled rail (4);
   the fastening element (5) including a second nose (23) located opposite the first nose (24) formed on the bottom of the housing base (2) and on the same side of the housing base (2) as the clamping connector, the first and second noses (24, 23) gripping the two legs of the profiled rail (4) from the outside when the switching device (1) is being snapped on the profiled rail (4); and
   the fastening element (5) including a pressable end portion (12) located on the side of the housing base (2) opposite the clamping connector when the switching device (1) is being snapped on the profiled rail (4), the end portion (12) extending beyond the housing base (2) on the side of the housing base (2) located opposite the clamping connector when the fastening element (5) is in the locked position, the fastening element (5) being in the unlocked position when the end portion (12) extending beyond the housing base (2) is pressed, the fastening element (5) being movable up to a second possible range of movement when the fastening element (5) is in the unlocked position, the second possible range of movement being greater than the first possible range of movement.

5. An electrical switching device (1) according to claim 4, characterized in that a projection (16) is provided on the fastening element (5) opposite the second nose (23) in such a way that the distance between the second nose (23) and the projection (16) is slightly greater than the width of the profiled rail (4).

6. An electrical switching device (1) for fixing to a profiled rail (4) having a longitudinal direction and a hat-shaped profile with two outward spring legs, the switching device (1) being snappable onto the profiled rail (4), the switching device (1) comprising:
   a housing base (2) including a clamping connector and a first nose (24), the clamping connector being located on one side of the housing base (2) for connecting to an assembly bar (6), the first nose (24) being formed on the bottom of the housing base (2);
   a fastening element (5), the fastening element (5) being movable relative to the housing base (2) along the bottom of the housing base (2), the fastening element (5) and the housing base (2) being resiliently supported against each other, the fastening element (5) being lockable in the housing base (2), the fastening element (5) including a second nose (23) located opposite the first nose (24) formed on the bottom of the housing base (2) and on the same side of the housing base (2) as the clamping connector, the first and second noses (24, 23) gripping two legs of a profiled rail (4) from the outside when the switching device (1) is being snapped on the profiled rail (4);

the fastening element (5) having a U-shaped spring clip (17) whose two legs have lateral detents (21), correspondingly opposed detents (22) being provided in the housing base (2), the detents (21, 22) have a profile which allows a spring force to change its direction as a function of the position of the fastening element (5);

the fastening element (5) being movable relative to the housing base (2) at least far enough to allow the switching device (1), when being snapped on the profiled rail (4), to be moved relative to the profiled rail (4) in a direction perpendicular to the longitudinal direction of the profiled rail (4) and far enough to be removed from the profiled rail (4) unhindered by the assembly bar (6); and the fastening element (5) including an end portion (12) extending beyond the housing base (2) on the side of the housing base (2) located opposite the clamping connector when the switching device (1) is being snapped on the profiled rail (4) and moved to a position in which the clamping connector can be connected to the assembly bar (6), the fastening element (5) being locked in the housing base (2) in this position and may be unlocked when the end portion (12) of the fastening element (5) extending beyond the housing base (2) is pressed.

7. An electrical switching device (1) according to claim 6, characterized in that the fastening element (5) consists of a plastic part extending over the entire housing base (2), and the U-shaped spring clip (17) is about half the length of the housing base (2) and is arranged above the second nose (23) of the fastening element (5).

8. An electrical switching device (1) for fixing to a profiled rail (4) having a longitudinal direction and a hat-shaped profile with two outward spring legs the switching device (1) being snappable onto the profiled rail (4), the switching device (1) comprising:

a housing base (2) including a clamping connector and a first nose (24), the clamping connector being located on one side of the housing base (2) for connecting to an assembly bar (6), the first nose (24) being formed on the bottom of the housing base (2);

a fastening element (5), the fastening element (5) being moveable relative to the housing base (2) along the bottom of the housing base (2), the fastening element (5) and the housing base (2) being resiliently supported against each other, the fastening element (5) being lockable in the housing base (2), the fastening element (5) including a second nose (23) located opposite the first nose (24) formed on the bottom of the housing base (2) and on the same side of the housing base (2) as the clamping connector, the first and second noses (24, 23) gripping two legs of a profiled rail (4) from the outside when the switching device (1) is being snapped on the profiled rail (4);

the fastening element (5) being movable relative to the housing base (2) at least far enough to allow the switching device (1), when being snapped on the profiled rail (4), to be moved relative to the profiled rail (4) in a direction perpendicular to the longitudinal direction of the profiled rail (4) and far enough to be removed from the profiled rail (4) unhindered by the assembly bar (6); and the fastening element (5) including a blocking catch (54) for locking the fastening element (5) in the bottom of the housing base (2), the blocking catch (54) having a hook-shaped free end (55) which is engageable in a corresponding opening (56) in the bottom of the housing base (2), the fastening element (5) being locked when the blocking catch (54) is engaged in the opening in the bottom of the housing base (2) and being unlocked when the blocking catch (54) is pressed.

9. An electrical switching device (1) for fixing to a profiled rail (4) having a longitudinal direction and a hat-shaped profile with two outward spring legs, the switching device (1) being snappable onto the profiled rail (4), the switching device (1) comprising:

a housing base (2) including a clamping connector and a first nose (24), the clamping connector being located on one side of the housing base (2) for connecting to an assembly bar (6), the first nose (24) being formed on the bottom of the housing base (2), the housing base (2) including a pair of flank portions (57) located on the bottom of the housing base (2);

a fastening element (5), the fastening element (5) being movable relative to the housing base (2) along the bottom of the housing base (2), the fastening element (5) and the housing base (2) being resiliently supported against each other, the fastening element (5) being lockable in the housing base (2), the fastening element (5) including a second nose (23) located opposite the first nose (24) formed on the bottom of the housing base (2) and on the same side of the housing base (2) as the clamping connector, the first and second noses (24, 23) gripping two legs of a profiled rail (4) from the outside when the switching device (1) is being snapped on the profiled rail (4), the fastening element (5) including a pair of springy tongues (51) extending substantially parallel with each other and bending outwardly, each one of the pair of springy tongues (51) engaging a corresponding one of the pair of flank portions (57) on the housing base (2) to provide a spring force which acts on the fastening element (5);

the fastening element (5) being movable relative to the housing base (2) at least far enough to allow the switching device (1), when being snapped on the profiled rail (4), to be moved relative to the profiled rail (4) in a direction perpendicular to the longitudinal direction of the profiled rail (4) and far enough to be removed from the profiled rail (4) unhindered by the assembly bar (6); and the fastening element (5) including a blocking catch (54) for locking the fastening element (5) in the bottom of the housing base (2), the blocking catch (54) having a hook-shaped free end (55) which is engageable in a corresponding opening (56) in the bottom of the housing base (2), the fastening element (5) being locked when the blocking catch (54) is engaged in the opening (56) in the bottom of the housing base (2) and being unlocked when the blocking catch (54) is pressed.

* * * * *